United States Patent [19]
Sasaki

[11] 4,099,498
[45] Jul. 11, 1978

[54] CONTACTLESS IGNITION APPARATUS FOR INTERNAL COMBUSTION ENGINE

[75] Inventor: Toshiyuki Sasaki, Nakamachi, Japan

[73] Assignee: Hitachi, Ltd., Japan

[21] Appl. No.: 628,123

[22] Filed: Nov. 3, 1975

Related U.S. Application Data

[63] Continuation of Ser. No. 474,028, May 28, 1974, abandoned.

[30] Foreign Application Priority Data

May 30, 1973 [JP] Japan .................................. 48-59786

[51] Int. Cl.² .............................................. F02P 5/04
[52] U.S. Cl. ............................ 123/117 R; 123/148 E
[58] Field of Search ........ 123/117 R, 148 CC, 148 E, 123/148 DS; 315/209 T

[56] References Cited

U.S. PATENT DOCUMENTS

| 3,072,823 | 1/1963 | Kirk | 123/148 CC |
|---|---|---|---|
| 3,272,930 | 9/1966 | Frank | 123/146.5 R |
| 3,464,397 | 10/1969 | Burson | 123/148 MC |
| 3,630,185 | 12/1971 | Struber et al. | 123/148 CC |
| 3,661,132 | 5/1972 | Farr et al. | 123/148 CC |
| 3,717,135 | 2/1973 | Mayashi et al. | 123/117 R |
| 3,779,219 | 12/1973 | Saita | 123/117 R |
| 3,910,243 | 10/1975 | Gau et al. | 123/148 E |

Primary Examiner—Charles J. Myhre
Assistant Examiner—David D. Reynolds
Attorney, Agent, or Firm—Craig & Antonelli

[57] ABSTRACT

A contactless ignition apparatus for internal combustion engines comprising first and second pickups for detecting different ignition timing points, wherein outputs of the pickups are introduced selectively to the ignition circuit for internal combustion engines thereby to control the ignition timing.

7 Claims, 5 Drawing Figures

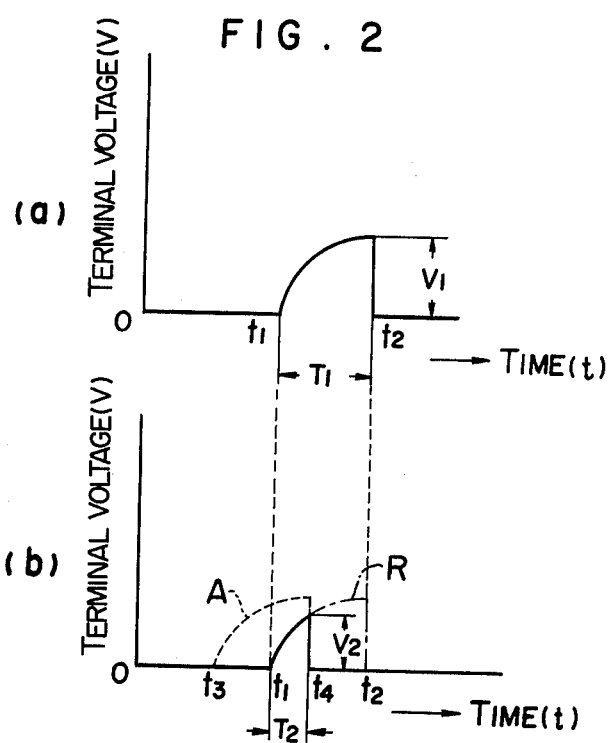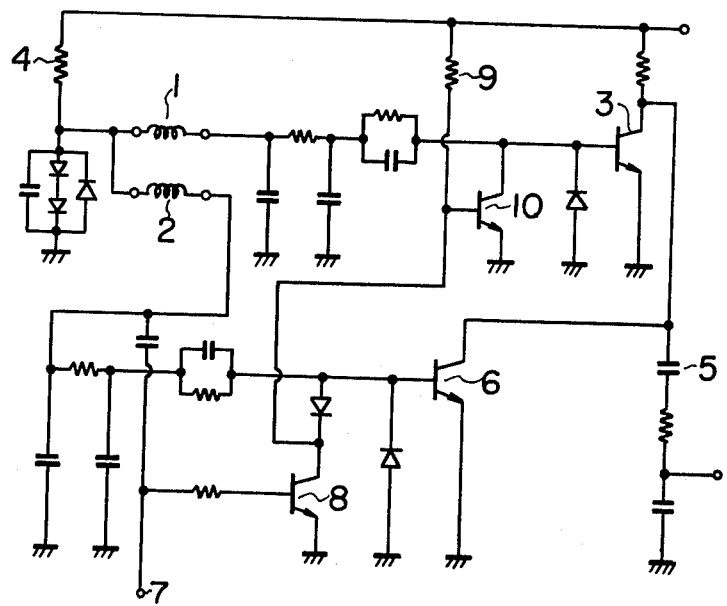

CONTACTLESS IGNITION APPARATUS FOR INTERNAL COMBUSTION ENGINE

This is a continuation of application Ser. No. 474,028 filed May 28, 1974, now abandoned.

The present invention relates to a contactless ignition apparatus for the automobile internal combustion engine, or more in particular to a system for switching the ignition timing points.

A method suggested for preventing air pollution due to exhaust gas consists in switching the ignition timing point in accordance with the running condition of the engine. In such a method, the ignition timing is retarded, for example, when the speed is being decreased.

A primary object of the present invention is to provide a contactless ignition apparatus for the internal combustion engine comprising, in addition to an ignition circuit, first and second pickup coils for detecting different ignition timing points and means for applying the outputs of the first and second pickups selectively to the ignition circuit in accordance with the running condition of the internal combustion engine thereby to control the ignition timing point.

Another object of the present invention is to provide means for preventing the reduction in maximum working revolutions or speed of the internal combustion engine using the contactless ignition apparatus of the above-mentioned type.

The above and other objects, features and advantages of the present invention will be made apparent by the detailed description taken in conjunction with the accompanying drawings, in which:

FIG. 2 is a diagram for explaining the disadvantage of the embodiment shown in FIG. 1; and FIGS. 3 to 5 are diagrams showing other embodiments of the ignition timing point detecting section of the contactless ignition apparatus according to the invention shown in FIG. 1.

Figure 1:
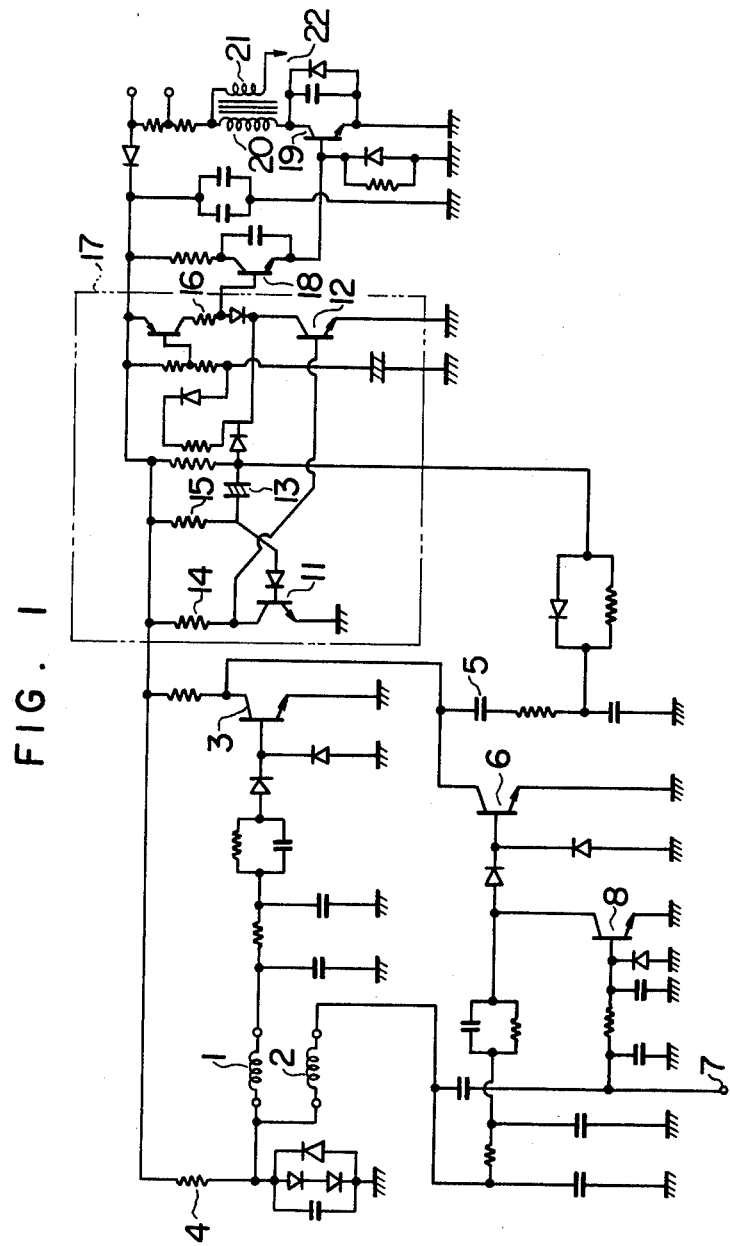
FIG. 1 is a circuit diagram showing an embodiment of the contactless ignition apparatus according to the invention and comprising a system for detecting different ignition timing points which are capable of being automatically switched in accordance with the engine condition.

In the contactless ignition apparatus shown in FIG. 1, a transistor 3 is normally in the conductive state due to a bias resistor 4. A pickup coil 1 for indicating the retarded ignition timing point produces a negative pulse immediately before an ignition timing point, so that the transistor 3 is turned off and electric charges necessary for actuating a circuit in the following stage are stored in a coupling capacitor 5. At the ignition timing point, the pickup coil 1 produces a positive pulse thereby to cause the conduction of the transistor 3. In the process, the charges stored in the coupling capacitor 5 are discharged through the transistor 3, thereby energizing the circuit in the following stage, that is, a monostable multivibrator 17 comprising transistors 11 and 12, electrolytic capacitor 13, resistors 14, 15 and 16. With the energization of the monostable multivibrator 17, an amplifying transistor 18 is temporarily turned off thereby to turn off a power transistor 19 temporarily, with the result that current stops flowing in the primary coil 20 of the ignition coils and a high voltage is induced in the secondary coil 21 to be discharged through an ignition plug 22.

Under this condition, the transistor 8 is in the conductive state due to an external signal applied to a terminal 7, so that the transistor 6 is maintained non-conductive thereby to enable the charging and discharging action of the capacitor 5. In the meantime, an output is produced from the pickup coil 2 for indicating the advanced ignition timing point. This output, however, is grounded and loses its effect due to the conduction of the transistor 8, so that the transistor 6 is maintained non-conductive in the absence of the output of the transistor 8 which otherwise might reach the transistor 6. In other words, when the running condition of the engine requires the retarded ignition timing point, an external signal is applied to the terminal 7 according to such a requirement thereby to render ineffective the output of the pickup 2 indicating the advanced ignition timing point, so that only the output of the pickup 1 indicating the retarded ignition timing point is applied to the transistor 3.

When the advanced ignition timing point is required, on the other hand, no external signal is applied to the terminal 7. Therefore, the transistors 8 and 6 are maintained in non-conductive and conductive states respectively, so that output signals from the pickup coils 1 and 2 are applied to the transistors 3 and 6 respectively. The output operation of the pickup 2 indicating the advanced ignition point is similar to that of the pickup 1 for indicating the retarded ignition timing point, the pickups 1 and 2 being set to produce outputs at a predetermined phase angle. Immediately before the predetermined advanced or lead angle ignition timing point, the pickup 2 produces a negative pulse thereby to render the transistor 6 non-conductive which has thus far been in conductive state. At the next instant, the pickup coil 1 produces a negative pulse to turn the transistor 3 off immediately before the predetermined retarded or lag angle ignition timing point. At the same time, the capacitor 5 begins to be charged. The transistor 6 is energized by a positive pulse generated by the pickup 2 for indicating the lead angle ignition timing point, the capacitor 5 discharges through the transistor 6, the monostable multivibrator 17 is energized thereby to turn the transistor 18 off temporarily, the power transistor 19 is turned off temporarily, the current in the primary coil 20 is cut off, and as a result the high voltage induced in the secondary coil 21 is discharged through the ignition plugs. At the next moment, a positive pulse indicating the lag angle ignition point is generated from the pickup coil 1 thereby to render the transistor 3 conductive. Under this condition, the capacitor 5 does not discharge, as it has already completed its discharge. As a consequence, the lag angle ignition timing point signal produced from the pickup coil 1 is ineffective.

The above-described embodiment of the invention has the disadvantage as mentioned below with reference to FIG. 2.

The operation of capacitor 5 during the lag angle ignition timing point control and lead angle ignition timing point control is shown in (a) and (b) of FIG. 2 respectively. In the drawings, the ordinate represents the terminal voltage V of the capacitor 5 and the abscissa the time $t$. In the case of lag angle ignition timing point control, as mentioned above, the output signal from the pickup coil 2 for indicating the lead angle ignition timing point is made ineffective, and therefore the capacitor 5 begins to be charged at the time $t_1$ when the transistor 3 is turned off by the first negative pulse produced by the pickup 1, and its terminal voltage is increased as shown in (a) of FIG. 2. At time $t_2$, the pickup coil 1 produces the positive pulse as mentioned earlier and the transistor 3 is rendered conductive thereby to cause the discharge of the capacitor 5. At this very instant, the terminal voltage across the capacitor 5 has reached $V_1$.

In the case of (b) of FIG. 2 showing the lead angle ignition timing point control, symbols $t_3$, $t_1$, $t_4$ and $t_2$ denote the time points of generation of the negative pulse by the pickup coil 2, negative pulse by the pickup coil 1, positive pulse by the pickup coil 2 and positive pulse by the pickup coil 1 respectively. The transistor 6 is turned off at time $t_3$, and therefore if it is assumed that the transistor 3 is also turned off at the time $t_3$, the capacitor 5 begins to be charged accordingly thereby to increase the terminal voltage in the manner as shown by curve A of (b) of FIG. 2. As a matter of fact, however, the transistor 3 is in a conductive state and therefore the capacitor 5 is not charged at time point $t_3$. At time point $t_1$ when a negative pulse is generated by the pickup coil 1, the transistor 3 is turned off and the capacitor 5 begins to be charged, so that the voltage across the capacitor 5 is increased along the curve R. When the pickup coil 2 produces a positive pulse and the transistor 6 is turned on at time $t_4$, the capacitor 5 begins to discharge. At this moment, the voltage across the capacitor 5 is only as high as $V_2$ in the drawing, which is apparently lower than the maximum charge voltage $V_1$ of the capacitor 5 in the case of the lag angle ignition point control. This is attributable to the fact that the charge time $T_2$ in the case of the lead angle ignition time point control is shorter than the capacitor charge time $T_1$ in the case of the lag angle ignition time point control, and it will be noted that this phenomenon becomes more conspicuous as the phase angle between the lead angle ignition point and the lag angle ignition timing point is increased, resulting in the disadvantage of lower maximum working revolutions at the lead angle than at the lag angle.

Figure 4:
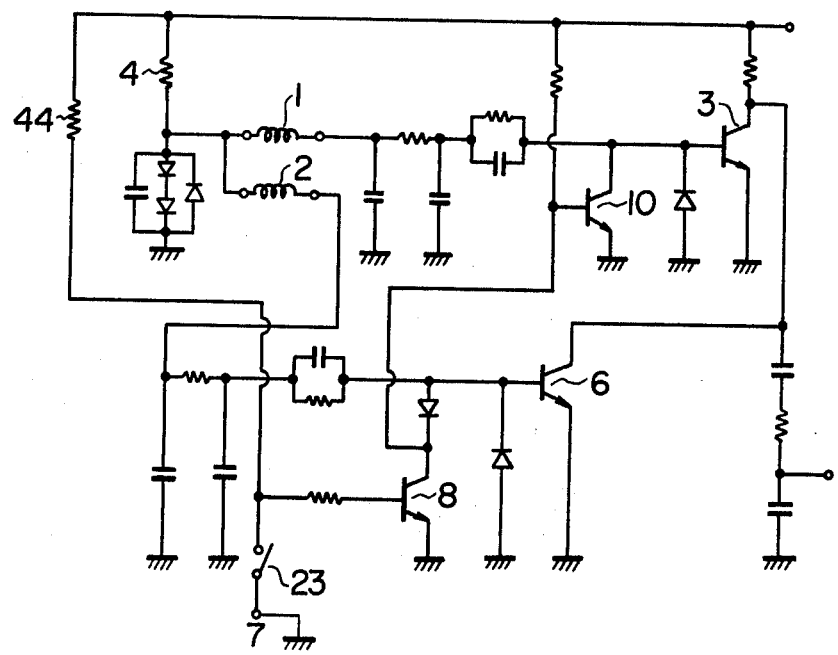
Figure 5:
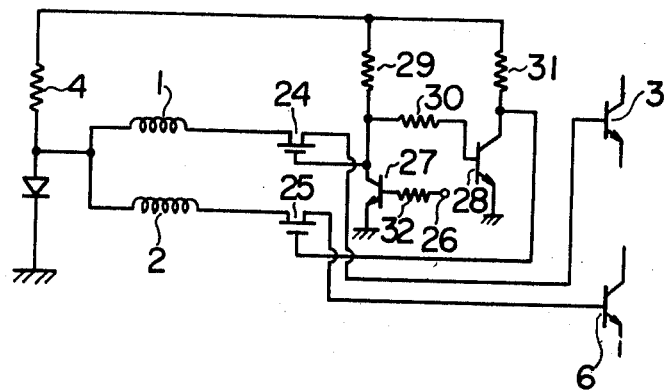

FIGS. 3 to 5 show only the ignition point detecting section according to other embodiments eliminating the above-mentioned disadvantage, the other component parts being identical with those shown in FIG. 1.

First referring to FIG. 3, an external signal applied to the terminal 7 renders the transistor 8 conductive during the lag angle ignition timing point control, but it is cut off during the lead angle ignition timing point control. Therefore it is possible to obviate the above-mentioned disadvantage by detecting the on-off condition of the transistor 8 and by controlling the base circuit of the transistor 3. In other words, as shown in the drawing, the collector-emitter circuit of a newly added transistor 10 is inserted in the base circuit of the transistor 3. At the same time, the emitter of the transistor 10 is grounded, and the base thereof is connected not only to a power supply through a resistor 9 but also to the collector of the transistor 8 inserted in the base circuit of the transistor 6.

In this arrangement, the transistor 8 is turned off during the lead angle ignition point control, that is, no external signal is applied to the terminal 7 then. At the same time, the collector current that has thus far flowed through the resistor 9 into the transistor 8 causes the transistor 10 to be forward biased. As a result, the transistor 10 is turned on and the signal from the pickup coil 1 indicating the lag angle ignition timing point which is supplied to the base of the transistor 3 becomes ineffective by being short-circuited and the transistor 3 is turned off for such a period.

During such a period, therefore, only the transistor 6 is subjected to on-off operation in response to the signal from the pickup coil 1 indicating the lead ignition timing point, thus eliminating the disadvantage of the first embodiment that both the signals indicating the lag ignition timing point and the lead ignition timing point are applied at the same time, causing the short charging time of the coupling capacitor 5 and the reduced maximum working revolutions.

In FIG. 4 showing still another embodiment of the invention, the terminal 7 is grounded instead of an external signal being applied thereto and the base current of the transistor 8 is controlled by means of the switch 23 which is opened only during the lag angle ignition timing point control. This system makes it easier to produce a control signal for the transistor 8 in comparison with the system of FIG. 3.

The operation of this circuit will be explained below. During the lag angle ignition timing point control, the switch 23 is opened and therefore the transistor 8 is energized as its base is forward biased through the resistor 44, so that the output of the pickup 2 indicating the lead angle ignition timing point is short-circuited and becomes ineffective. Under these condition, the transistor 8 is in the conductive state and therefore the transistor 10 is turned off, as already mentioned with reference to the embodiment of FIG. 3. No explanation will be made of the circuit operation due to the output signal from the pickup coil 1 which is quite the same as in the embodiment of FIG. 3.

During the lead angle ignition timing point control, on the other hand, the switch 23 is closed thereby to turn off the transistor 8, so that the transistor 10 is energized again thereby to short-circuit and make ineffective the output from the pickup coil 1. In this case, too, the circuit operation due to the output signal from the pickup coil 2 is quite the same as in the embodiment of FIG. 3 and therefore no description thereof will be made here.

As another possibility, an output of either of the pickup coils may be cut off directly as shown in the embodiment of FIG. 5. In this embodiment, reference numerals 24 and 25 show field effect transistors, numeral 26 an external terminal, numerals 27 and 28 transistors, numerals 29, 30, 31 and 32 resistors. At the time of speed reduction or the like when lagging of angle is required, the transistor 27 is energized in response to an input signal from the external terminal 26 thereby to turn off the field effect transistor 25. Thus only the output from the pickup coil 1 is effective during the lag angle ignition timing point control, whereas only the output from the pickup coil 2 remains effective during the lead angle ignition timing point control, thereby achieving the object of the invention.

The running conditions of the engine on the basis of which the switching of lead and lag angles is determined include the temperature, revolutions and load condition of the engine. The temperature is represented by the water temperature of the engine; the revolutions by revolutions per minute, opening of the accelerator and the position of the change gears; and the load condition by the negative pressure of the in-take manifold and the opening of the throttle.

The application of an external signal to the terminal 7 in the embodiments shown in FIGS. 1 to 3, the operation of the switch 23 in the embodiment of FIG. 4 and the application of an external signal to the terminal 26 in the embodiment of FIG. 5 are controlld in accordance with the above-mentioned factors representing the running conditions of the engine. An actual system for the control, however, is beyond the scope of the present invention and will not be explained herein.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

What is claimed is:

1. A contactless ignition apparatus for an internal combustion engine having an ignition circuit, said apparatus comprising:

first and second pickup coils for detecting different ignition timing points, said first and second pickup coils being so arranged that each of said first and second pickup coils produces an output necessary for actuating said ignition circuit, said first pickup coil being so arranged as to detect the lag angle ignition timing point, said second pickup coil being so arranged as to detect the lead angle ignition timing point, and first means for introducing selectively one of the respective outputs of said first and second pickup coils to said ignition circuit thereby to control ignition timing, said first means including second means for rendering ineffective the output of said second pickup coil, in response to an external signal representing the running condition of the engine to which said apparatus is coupled, when said external signal indicates that the running condition of the engine requires ignition at the lag angle position timing point, said second means including a first switching transistor, the collector-emitter circuit of said first switching transistor being connected in parallel to the output of said second pickup coil, the base current of said first switching transistor being controlled in response to the external signal representing the running condition of the engine to which said apparatus is coupled thereby to control the on-off operation of said first switching transistor.

2. A contactless ignition apparatus according to claim 1, in which said first means includes third means for rendering ineffective the output of said first pickup coil, in response to the external signal representing the running condition of the engine to which said apparatus is coupled, when said external signal indicates that the running condition of the engine requires ignition at the lead angle ignition timing point.

3. A contactless ignition apparatus according to claim 1, in which the respective outputs of said first and second pickup coils are always equivalent to each other and said first means includes a terminal to which the external signal is applied in accordance with the running condition of the engine.

4. A contactless ignition apparatus for an internal combustion engine having an ignition circuit, said apparatus comprising:

first and second pickup coils for detecting different ignition timing points, said first and second pickup coils being so arranged that each of said first and second pickup coils produces an output necessary for actuating said ignition circuit, said first pickup coil being so arranged as to detect the lag angle ignition timing point, said second pickup coil being so arranged as to detect the lead angle ignition timing point, and first means for introducing selectively one of the respective outputs of said first and second pickup coils to said ignition circuit thereby to control ignition timing, said first means including second and third means for rendering ineffective the respective outputs of said second and first pickup coils, in response to an external signal representing the running condition of the engine to which said apparatus is coupled, when said external signal indicates that the running condition of the engine requires ignition at the lag and lead ignition timing points, respectively, said second means including a first switching transistor, the collector-emitter circuit of said first switching transistor being connected in parallel to the output of said second pickup coil, said third means including a second switching transistor, the collector-emitter circuit of said second switching transistor being connected in parallel to the output of said first pickup coil, the base circuit of said second switching transistor being connected to the collector-emitter circuit of said first switching transistor.

5. A contactless ignition apparatus according to claim 4, in which the on-off operations of said first switching transistor is controlled by applying said external signal to the base of said first switching transistor.

6. A contactless ignition apparatus according to claim 4, further comprising switching means for gounding the base circuit of said first switching transistor, said switching means being subjected to on-off operation in response to said external signal.

7. A contactless ignition apparatus according to claim 3, in which the respective outputs of said first and second pickup coils are always equivalent to each other and said first means includes a terminal to which the external signal is applied in accordance with the running condition of the engine.

* * * * *